(12) United States Patent
Park

(10) Patent No.: US 6,289,038 B1
(45) Date of Patent: Sep. 11, 2001

(54) PARALLEL HOPPING HYBRID DIRECT SEQUENCE/SLOW FREQUENCY HOPPING CDMA SYSTEM

(75) Inventor: Chan-bum Park, Seoul (KR)

(73) Assignee: Samsung Electronics Co., Inc. (KR)

( * ) Notice: Subject to any disclaimer, the term of this patent is extended or adjusted under 35 U.S.C. 154(b) by 0 days.

(21) Appl. No.: 09/556,539

(22) Filed: Apr. 24, 2000

Related U.S. Application Data

(62) Division of application No. 09/232,739, filed on Jan. 15, 1999.

(51) Int. Cl.$^7$ .................................................. H04K 1/00
(52) U.S. Cl. ................................... 375/131; 375/136
(58) Field of Search .................................. 375/130, 132, 375/136, 146, 147; 370/342, 344

(56) References Cited

U.S. PATENT DOCUMENTS

| | | | |
|---|---|---|---|
| 4,355,399 | * 10/1982 | Timor | 371/131 |
| 5,657,343 | * 8/1997 | Schilling | 375/132 |
| 5,737,358 | * 4/1998 | Ritz et al. | 375/138 |
| 5,812,522 | * 9/1998 | Lee et al. | 375/132 |
| 5,894,473 | * 4/1999 | Dent | 370/342 |
| 6,112,094 | * 8/2000 | Dent | 375/134 |
| 6,128,328 | * 10/2000 | Schilling | 375/132 |

OTHER PUBLICATIONS

Bernard Skalr "Digital Communication Fundamental and Application," Prentice Hall, pp 550–570, 1988.*

* cited by examiner

Primary Examiner—Tesfaldet Bocure
(74) Attorney, Agent, or Firm—Dilworth & Barrese, LLP

(57) ABSTRACT

A radio system is disclosed for supporting a greater number of users than can be supported in a conventional CDMA system that supports multiple users. The radio system is a hybrid system combining elements of conventional spread spectrum techniques. The system may be defined as a parallel hopping hybrid direct sequence (DS)/slow frequency hopping (SFH) code division multiple access (CDMA) system in combination with a DS/CDMA system, frequency hopping (FH)/CDMA system and a multi-carrier system.

8 Claims, 13 Drawing Sheets

PARALLEL HOPPING HYBRID DIRECT SEQUENCE/SLOW FREQUENCY HOPPING CDMA SYSTEM

This application is a divisional application of U.S. Ser. No. 09/232,739, filed Jan. 15, 1999.

FIELD OF THE INVENTION

The present invention relates to code division multiple access (CDMA) systems, and more particularly, it relates to a parallel hopping hybrid direct sequence (DS)/slow frequency hopping (SFH) code division multiple access (CDMA) system.

DESCRIPTION OF THE RELATED ART

Over the last decade, deployment of wireless communications has been significant. The wireless communication market may be a $60 billion dollar industry by the turn of the century. Expanded radio channel capacity is the key objective of a wireless network to meet demand for the indefinite future.

At present there are two basic strategies whereby a fixed spectrum resource can be allocated to different users: narrowband channelized systems and wideband systems. Two narrowband systems are Frequency-division multiple access (FDMA), where each user is assigned to a different frequency. Guard bands are maintained between adjacent signals to minimize crosstalk between channels. The second being Time-division multiple access (TDMA), where each user is assigned to a different time slot. By contrast, in wideband systems, the entire system bandwidth is made available to each user and is many times larger than the bandwidth required to transmit information. Such systems are referred to as Spread Spectrum (SS) systems. In recent years, spread spectrum has moved from military to commercial communications, culminating in the introduction of International Standard IS-95 code division multiple access (CDMA) technology as an alternative standard for commercial digital cellular and personal communication system (PCS) networks. The IS-95 CDMA is now being used in numerous cellular and PCS markets around the world. Multiple access systems share a fixed resource (i.e. frequency spectrum) to provide voice channels on demand to users. The IS-95 standard employs a type of spread spectrum technology called direct-sequence spread spectrum (DS-SS). In a direct sequence (DS) code-division multiple access (CDMA) system, a signal to be transmitted occupies a bandwidth in excess of the minimum necessary to send the information; the band spread is accomplished by means of a code that is independent of the data, and a synchronized reception with the code at the receiver is used for despreading the subsequent data recovery. In operation, a data signal is multiplied by a pseudo-random noise (PN) sequence having a faster data rate than the data signal to be transmitted.

Another form of spread spectrum is called frequency-hopped spread spectrum (FH-SS) where the carrier frequency signal is moved (hopped) around in the band in a pseudorandom fashion. The result is an increase in effective bandwidth over time. Specifically, in a frequency hopped spread spectrum system (FH-SS) the carrier frequency is shifted in discrete increments in a pattern generated by a code sequence. In a (FH-SS) system, the signal frequency remains constant for a specified time duration, referred to as a hopping time $T_h$. The (FH-SS) system can be either a fast-hop system or a slow hop system. In a fast-hop system, the frequency hopping occurs at the rate that is greater than the message bit rate. In a slow-hop system, the hop rate is less than the message bit rate. There is also an intermediate situation in which the hop rate and message bit rate are of the same order of magnitude.

FH-SS radio systems experience occasional strong bursty errors, while DS-SS radio systems experience continuous but lower-level random errors. With DS-SS radio systems, single errors are dispersed randomly over time; with FH-SS radio systems, errors are distributed in clusters. Bursty errors are attributable to fading or single-frequency interference, which is time and frequency dependent. The DS-SS spreads the information in both the time and frequency domains, thus providing time and frequency diversity thereby minimizing the effects of fading and interference.

Hybrid DS/FH CDMA radio systems combine the advantages of the DS and FH radio systems. The hybrid DS/FH CDMA system spreads the bandwidth partially with direct sequence spreading method and partially with frequency hopping spreading method over the entire available spreading bandwidth. FIG. 1 is a prior art illustration of a conventional transmitter unit in accordance with a hybrid DS/FH CDMA system. As illustrated in FIG. 1, data is first spread by a pseudo-noise sequence at multiplier 6 and the resulting signal is then multiplied at multiplier 8 by a carrier frequency, $f_h(t)$ generated in frequency synthesizer 10.

Recently, multi-carrier CDMA systems have separated the entire available frequency bandwidth into a plurality of sub-bands to transmit data. The multi-carrier method is advantageous in that it is possible to obtain frequency diversity as a result. FIG. 2 illustrates a transmitting unit of a conventional multi-carrier DS CDMA system. It is shown at FIG. 2 that the signal data is multiplied by a plurality of carrier frequencies, $f_1, f_2, \ldots f_M$ 14 and then combined at a combiner unit 16 prior to transmission.

Bandwidth spreading utilizing only the direct sequence (DS-SS) method, is disadvantageous for a number of reasons including; first, the PN sequence chip rate requires complex hardware; second, a very fast signal processing algorithm is required to perform demodulation. The frequency synthesizer becomes complicated in the case of a spreading bandwidth that uses the entire available bandwidth with only the frequency hopping method.

Additionally, in the case of using a hybrid CDMA system in combination with a DS system and a FH system, it is possible to decrease the chip rate of the PN sequence and thereby make the frequency synthesizer less complicated. A tradeoff occurs, however, in that the combined system limits the number of users as compared to the number of users that may simultaneously access a DS CDMA system.

Another well known technique in the art is a multi-carrier DS CDMA system that transmits a narrow band DS spread spectrum signal using multiple carriers in contrast to the broadband single carrier DS CDMA system. The multi-carrier DS CDMA system makes it possible to decrease the system complexity while maintaining the same efficiency found in the single-carrier DS CDMA by substituting the advantages of the path diversity effect of the conventional RAKE receiver of a single carrier DS CDMA system for the advantages of a frequency diversity effect that is characteristic of a multi-carrier DS CDMA system.

However, in the multi-carrier DS CDMA system, each user is utilizing the entire frequency band, which is disadvantageous in that interference occurs in the whole frequency band due to other users.

SUMMARY OF THE INVENTION

The present invention provides an apparatus for a parallel hopping hybrid DS/SFH CDMA system. Specifically, the present invention is a radio system that combines the characteristics of a conventional CDMA system with characteristics of a DS/CDMA system, an FH/CDMA system, and a multi-carrier CDMA system. The present invention advantageously supports more users than can be supported in a conventional CDMA system that supports multiple users.

Other objects and advantages of the invention will become apparent upon reading the detailed description and upon reference to the drawings.

DESCRIPTION OF THE PREFERRED EMBODIMENTS

The present invention describes a hybrid DS/SFH CDMA radio communication system that combines aspects of a direct sequence (DS) code division multiple access (CDMA) system, with a frequency hopping (FH) CDMA system and a multi-carrier system.

The hybrid DS/SFH CDMA system according to the present invention may be characterized as a partial transmission multi-carrier DS CDMA system. However, the method of the present invention, in actual operation, does not generate a hopping frequency in the frequency synthesizer by PN sequence as in a conventional hybrid DS/SFH CDMA system. Instead, the present method arbitrarily selects a subset of frequencies from among a set of available carriers for parallel transmission. That is, the set of available carriers will consist of a group of switched on frequencies and switched off frequencies.

Additionally, the hybrid DS/SFH CDMA system according to the present invention can obtain an additional frequency diversity effect in the time varying channel by selectively hopping the carrier, which is transmitted every hopping continuation time, in contrast with a partial transmission multi-carrier DS CDMA system, which transmits the pre-assigned subset of carrier frequencies continuously.

In a conventional multi-carrier DS CDMA system, users use the entire available frequency bandwidth. So, users in a frequency bandwidth suffer from interference from each other. As a result, the overall interference of the conventional multi-carrier DS CDMA system can be reduced by transmitting a narrow band DS CDMA signal using a subset of carriers among the set of available carriers. In such a system, the interference of the system in the frequency band of each carrier is decreased, however, the frequency diversity is also decreased, with performance degradation being a possible result.

The present invention, by contrast, is capable of decreasing interference while maintaining frequency diversity by utilizing a method of overlapping frequency bands to increase the number of carriers within the assigned frequency bandwidth.

The addition of parallel hopping to the hybrid DS/SFH CDMA system of the present invention results in improved performance in the fading channel. It has been demonstrated that the addition of parallel hopping, to achieve frequency diversity, to a hybrid DS/SFH CDMA system, exhibits higher performance than a DS CDMA system, which performs path diversity combining. Parallel hopping is accomplished by hopping frequencies using multiple carriers, while a conventional hybrid DS/SFH CDMA system hops frequencies using a single carrier.

When the number of users is small, the lower bit error rate is achieved with a large number of parallel hopping frequencies resulting in a large number of frequency diversity. By contrast, when the number of users is large, the lower bit error rate is achieved with a small number of parallel hopping frequencies avoiding from interferences from the other users.

Figure 1:
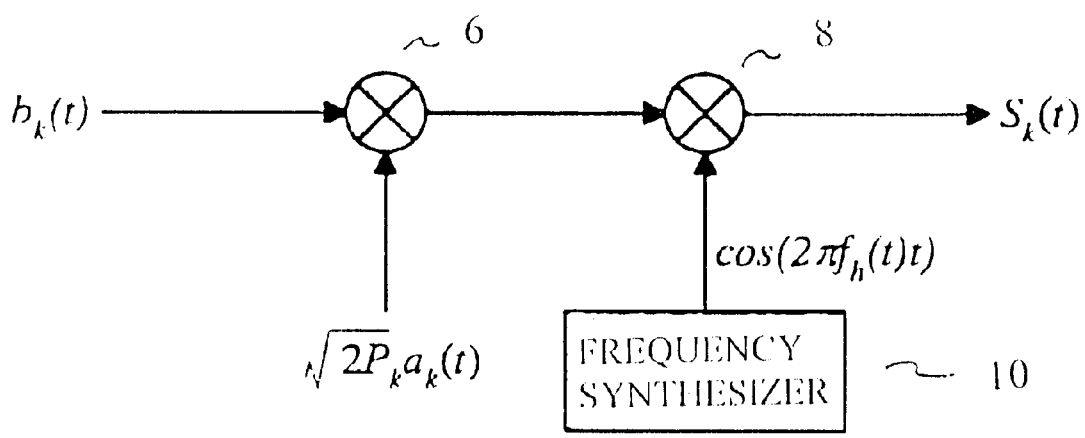
FIG. 1 illustrates a block diagram of a transmitter of a conventional hybrid DS/FH CDMA system.
Figure 2:
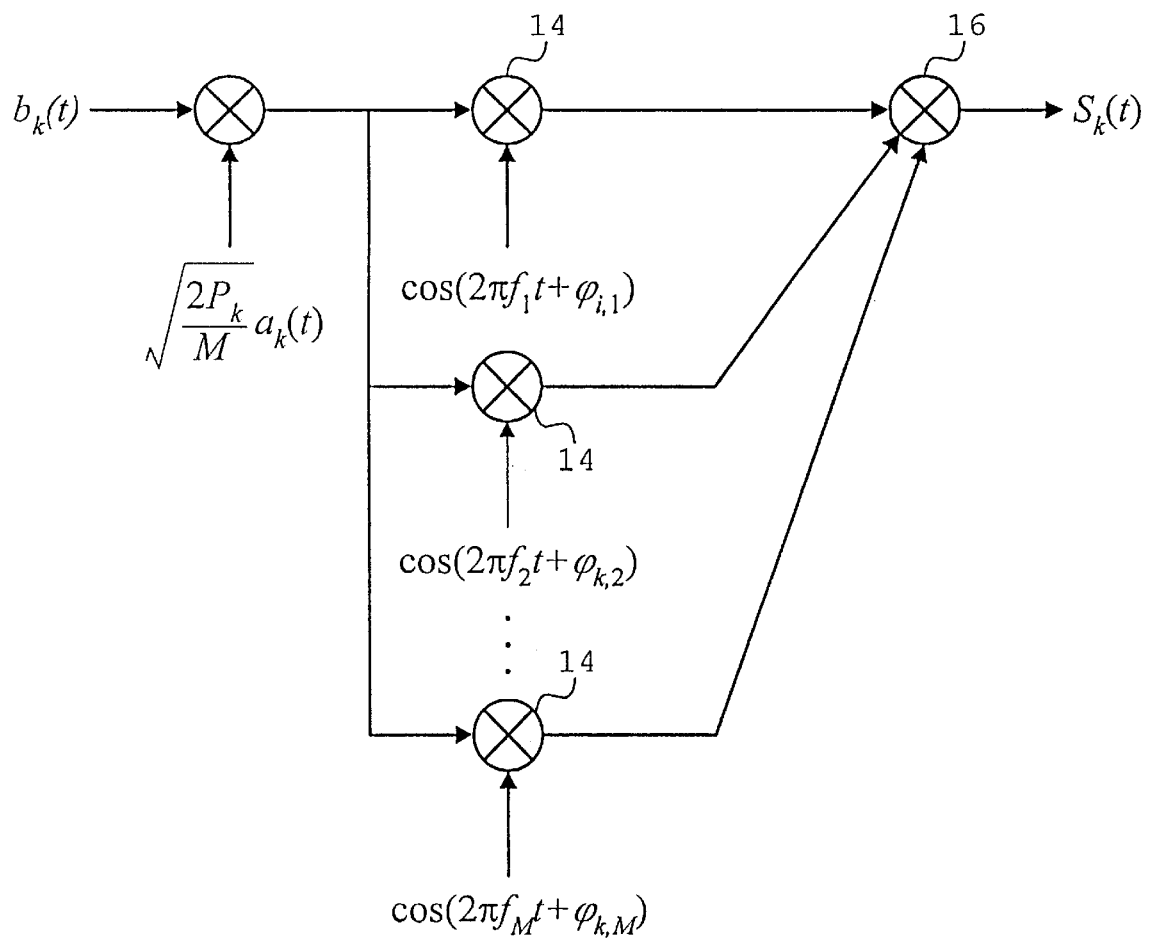
FIG. 2 illustrates a block diagram of a transmitter of a conventional multi-carrier DS CDMA system.
Figure 3:
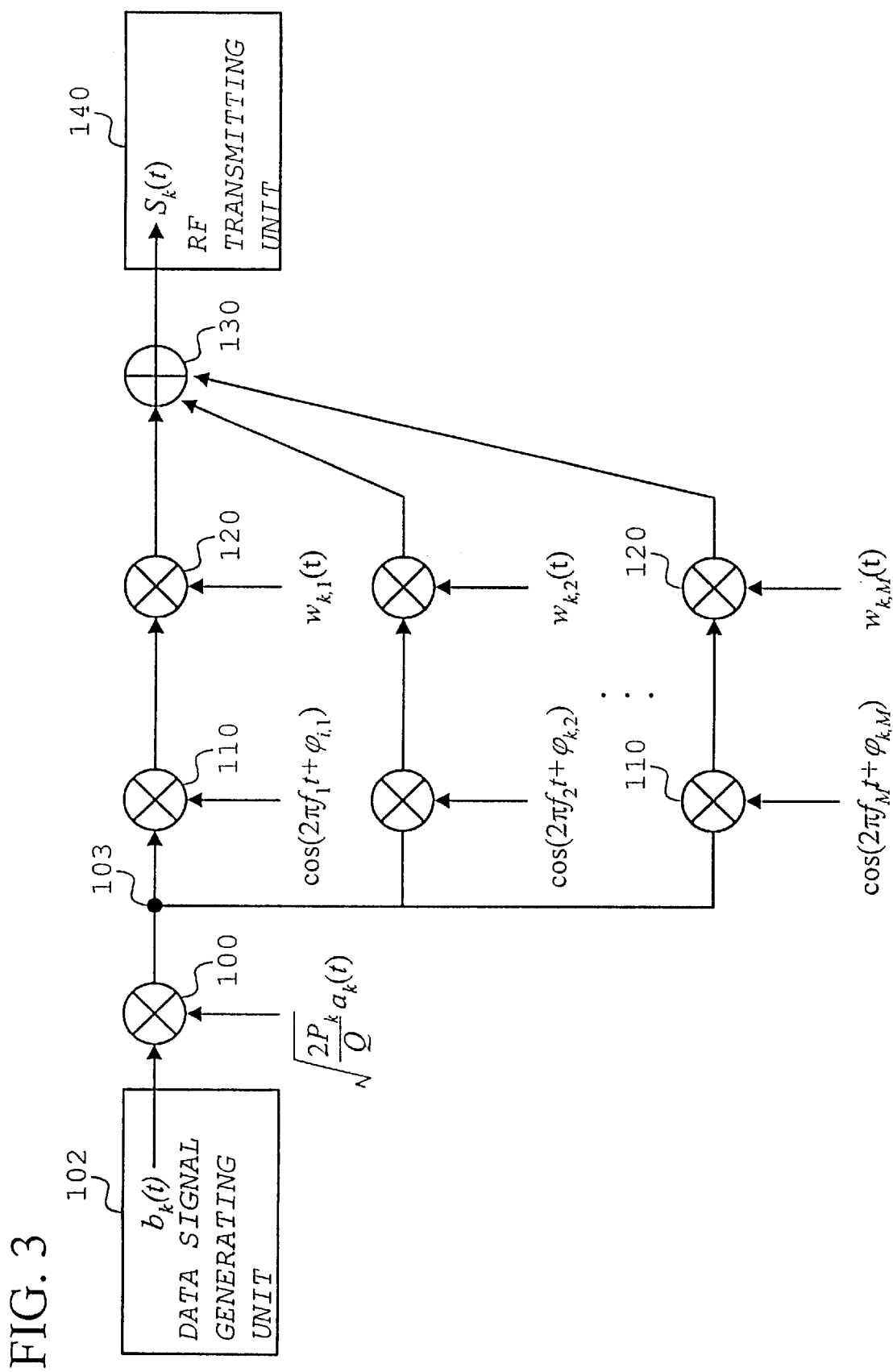
FIG. 3 illustrates a block diagram of a transmitter of a parallel hopping hybrid DS/SFH CDMA system according to the present invention.

Referring now to the figures in detail. FIG. 3 is a schematic block diagram of a transmitter in accordance with the teachings of the present invention. As illustrated in FIG. 3, the transmitter includes:

a data signal generating unit 102 for generating data to be transmitted;

a spreader 100 for spreading the data signal by a PN sequence thereby generating a spread spectrum signal 103.

a plurality of frequency hopping multipliers 110 for multiplying the spread spectrum signal by a carrier in each sub-band. The frequency hopping apparatus 110 multiplies the data signal by a unique hopping frequency in each sub-band.

a plurality of gate function generators 120 for selecting specific sub-bands by switching on/off the signal transmission of each sub-band.

a combiner 130 for combining signals from the sub-bands selected by the gate function generators 120; and an RF (Radio Frequency) transmitting unit 140, which transmits the combined signal via a radio path.

Figure 4:
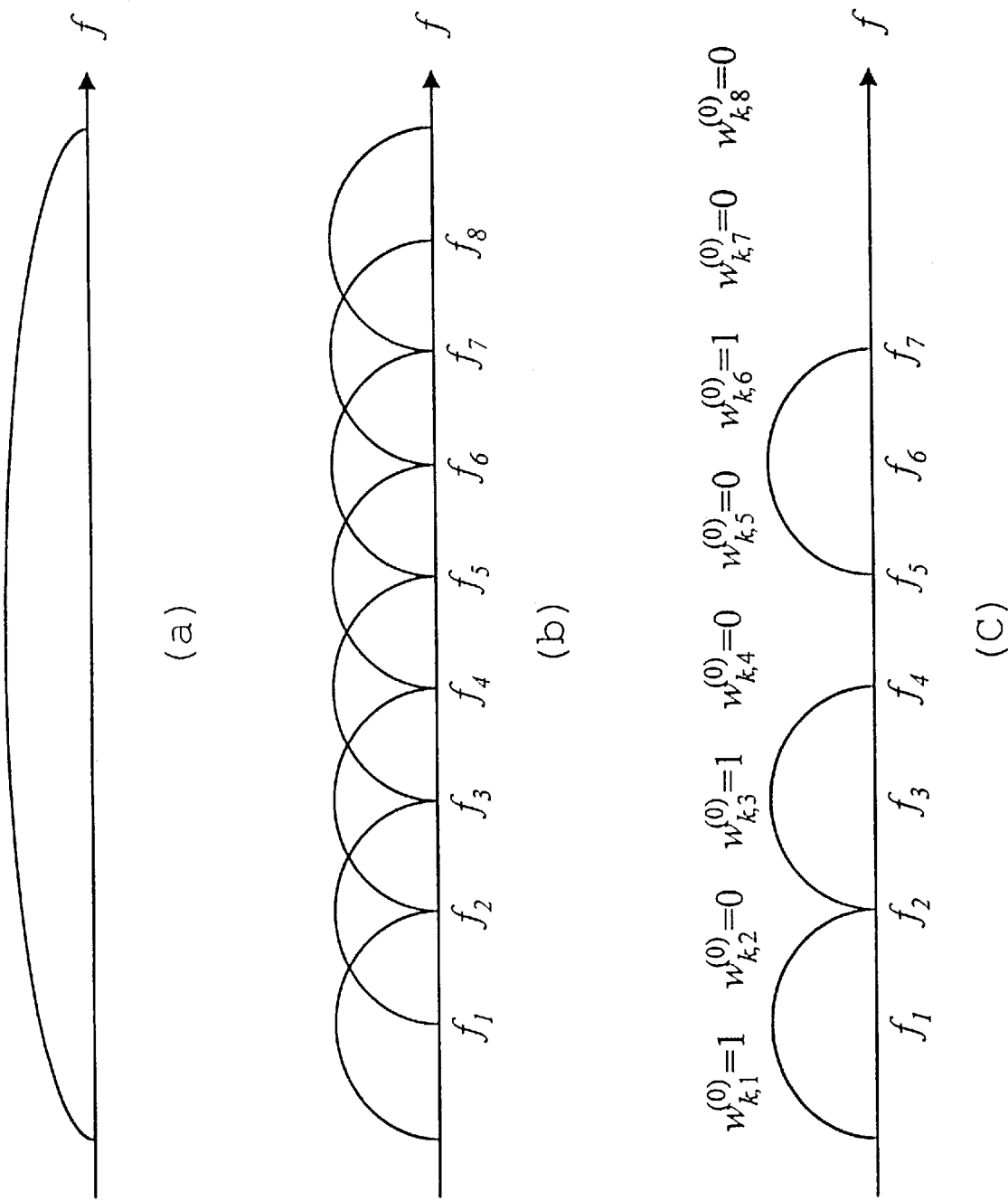
FIG. 4 illustrates a power spectrum density characteristic of spread spectrum waveforms generated in accordance with the present invention.

FIG. 4 illustrates the power spectrum density characteristic of the spread spectrum waveform generated by the present invention. FIG. 4a illustrates a DS spread spectrum signal, which is generated by multiplying a data signal by a pseudo-noise (PN) sequence, prior to the frequency hopping stage. FIG. 4b illustrates the signal of FIG. 4a after frequency hopping. FIG. 4b illustrates a plurality of waveform components generated at each available carrier frequency band. FIG. 4c shows a summed waveform consisting of particular waveform components selected by the gate function generator in FIG. 4b. In particular, for the example illustrated at FIG. 4c, only three of the eight waveform components (i.e. f1, f3, and f6) are selected for transmission.

Figure 5:
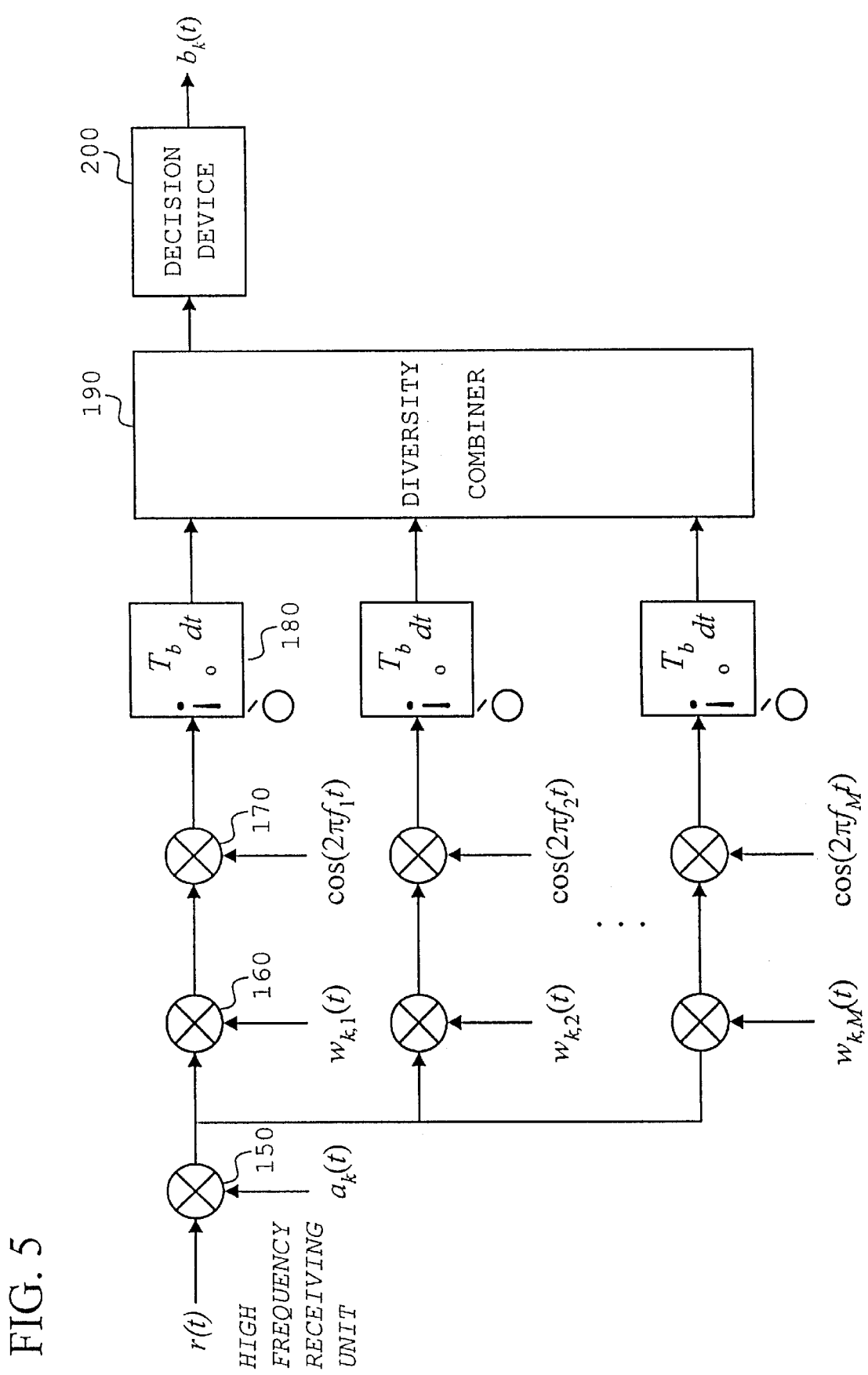
FIG. 5 illustrates a block diagram of a receiver of parallel hopping hybrid DS/SFH CDMA system according to the present invention.

FIG. 5 illustrates a block diagram of a receiver in accordance with an embodiment of the present invention. The receiver includes;

a high frequency receiving unit 140 for changing the received signal into a baseband signal;

a DS despreader 150 that despreads the baseband signal bandwidth by multiplying the baseband signal by a PN sequence, wherein the PN sequence is the same PN sequence utilized in the transmission of the signal.

a plurality of gate function generators 160 that select specific sub-bands by switching on/off the signal at each sub-band. The gate function generators are the same gate function generators used in the transmitter.

a plurality of frequency dehopping apparatus 170 that perform frequency dehopping to the original frequency band by multiplying signals in each sub-band by the same hopping frequency used in the transmitter.

apparatus for integrate-and-dump detection 180 that calculates the correlation value by integrating the spread signal received from the de-hopping apparatus. Each of the integrate-and-dump detectors having weight values in each branch.

a diversity combiner 190 that combines the signals output from each of the respective integrate and dump detectors 180, outputting a single diversity combined value.

a decision device 200 for estimating the initially transmitted signal from the diversity combined values.

Hereafter, the function of the parallel hopping hybrid DS/SFH CDMA system according to the present invention will be described in detail with reference to FIGS. 3–10.

Referring now to FIG. 3, given the total number of users to be K, FIG. 3 illustrates an exemplary signal transmission for the kth user where (1<=k<=K). Assuming that the data signal has been modulated using binary phase shift keying (BPSK), the data signal for the kth user, $b_k(t)$, would therefore be provided as a rectangular pulse stream with duration, T, where the amplitude of the nth pulse, $b_k^{(n)}$, has a value of $\{1,-1\}$ during the time interval of nT<=t<=(n+1)T.

The BPSK modulated data signal is then spread by a DS spreading signal, $a_k(t)$ 100. The amplitude of the lth chip of the spreading signal, $a_k'(t)$ has a value of $\{1,-1\}$ during the time of $lT_c \leq t \leq (l+1)T_c$. If it is assumed that each data pulse is comprised of N chips, the data pulse time interval T is equivalent to $T=NT_c$. Parallel Frequency Hopping (FH) 110 is then applied to the DS spread spectrum signal by selecting Q carriers from among the M available carriers.

$W_{k,m}(t)$ is a gate function, where k defines the kth user and m, where (1<=m<=M), defines the mth carrier of M available carriers for parallel frequency hopping. The gate function has values during the frequency hopping time, $jT_h \leq t \leq (j+1)T_h$ such that $w^j_{k,m}$ is either $\{+1,0\}$. That is, during the frequency hopping time, the gate function can take on one of two discrete values $\{+1,0\}$ describing an on/off state of the gate respectively. The on state for a gate indicates that the corresponding carrier frequency will be transmitted during the frequency hopping time.

The signal, $s_k(t)$, which is transmitted for the kth user, is represented by Eq. 1 as:

$$s_k(t) = \sum_{m=1}^{M} \sqrt{\frac{2P_k}{Q}} w_{k,m}(t) b_k(t) a_k(t) \cos(2\pi f_m t + \phi_{k,m}); \text{ and} \quad [\text{Eq. 1}]$$

where:

M is the number of available sub-bands for use as parallel hopping frequencies;

Q is the number of selected sub-bands to be used as parallel hopping frequencies;

$P_k$ is power transmitted by the kth user;

$b_k(t)$ is a data signal to be transmitted for the kth user;

$a_k(t)$ is a PN sequence (i.e. spreading signal) used to multiply the data signal;

$w_{k,m}(t)$ is a gate function generated in the mth gate function generator for the kth user;

$f_m$ is the mth carrier frequency being multiplied by the mth frequency hopping multiplier; and $\phi_{k,m}$ is the mth phase component of the kth user.

FIG. 4c illustrates a power spectrum density characteristic of a signal being transmitted, where the number of sub-bands, M=8 and the number of selected sub-bands, Q=3. It should be noted that the system of the present invention is equivalent to a multi-carrier DS CDMA system, whenever the frequency bands are not overlapped and M=Q. Further, the system of the present invention is equivalent to a conventional DS/SFH CDMA system or hybrid frequency division multiple access (FDMA)/CDMA system whenever the frequency bands do not overlap and Q=1.

However, the once assigned carrier is continuously maintained in the FDMA/CDMA system, on the other hand, the parallel hopping hybrid DS/SFH CDMA system according to the present invention has an advantage in that it is not continuously influenced by serious fading as it hops frequencies at every hopping interval.

Referring now to FIG. 5, a block diagram of a receiver constructed in accordance with the teachings of the present invention is illustrated. FIG. 5 illustrates a signal received from the kth user, where (1<=k<=K). The signal, is received through a Nakagami fading channel, and can be described by equation 2 as:

$$r(t) = \sum_{k=1}^{K} \sum_{m=1}^{M} \sum_{l=1}^{L} \sqrt{\frac{2P_k}{Q}} \beta_{k,m,l} w_{k,m}(t - t_{k,l}) b_k(t - t_{k,l}) a_k(t - t_{k,l}) \quad [\text{Eq. 2}]$$

$$\cos(2\pi f_m t + \phi_{k,m,l}) + n(t)$$

where;

M is the total number of available sub-bands;

Q is the number of selected sub-bands where (Q<=M);

K is the number of users;

L is the number of paths;

$P_k$ is transmission power at the transmitting unit for the kth user;

$b_k(t)$ is data signal transmitted from the transmitting unit for the kth user;

$a_k(t)$ is pseudo-random noise (PN) sequence being multiplied in the spreader for direct sequence (DS) spread spectrum of the transmitting unit for the kth user;

$w_{k,m}(t)$ is gate function being generated in the mth gate function generator of the kth user;

$f_m$ is the mth carrier being multiplied in the frequency dehopping apparatus;

$\beta_{k,m,l}$ is path gain of fading channel for the lth path of the mth carrier of the kth user having a Nakagami distribution;

$t_{k,l}$ is path delay time for the lth path of the kth user;

$\phi_{k,m,l}$ is the phase component for the lth path of the mth carrier of the kth user;

n(t) is additive white Gaussian noise (AWGN) with zero-mean and double-sided spectrum density of $N_o/2$.

The high frequency receiving unit 140 receives r(t), whereby the waveform is first multiplied by a pseudo-random noise (PN) sequence, $a_k(t)$ 150 generating a de-spread signal. The de-spread signal is then provided to a plurality of gate functions 160, $w_{k,m}(t)$. Each gate function, $w_{k,m}(t)$, will have a value of either +1 or 0 corresponding to its value at the transmitter. A correlation operation 180 is then performed in each sub-band for which the gate function is +1. Each correlation result is input to a diversity combiner 190 to determine the initially transmitted data.

FIGS. 6–10 are graphs of bit-error rate v. signal to noise ratio, $E_b/N_o$ which illustrate the performance advantages achievable by the parallel hopping hybrid DS/SFH CDMA system according to the present invention. In particular, FIGS. 6–10 illustrate the result of a bit error rate calculation for a Nakagami fading channel with the following set of parameters: a hybrid ratio of the spread spectrum (SS) system, L fading channels, a Nakagami fading coefficient, m, a fading attenuation coefficient, d, the number of all users, K, a diversity combining equal to A. It should be understood that the diversity combining value, A, is equivalent to the frequency diversity, Q in the case of a parallel hopping system. Also in the case of a direct sequence system, the diversity combining value, A, is equivalent to the path diversity combining, $\lambda$.

FIG. 6 illustrates the bit error rate for the specific case in which the fading coefficient, m=0.75, the number of users, K=10, and where the hopping frequency bands are not overlapped.

For comparison, FIG. 6 further illustrates the bit error rate for the case where the path diversity combining, $\lambda$ of a DS CDMA system, which has a spread spectrum processing gain of 1024, is 4 and 8.

Figure 6A:
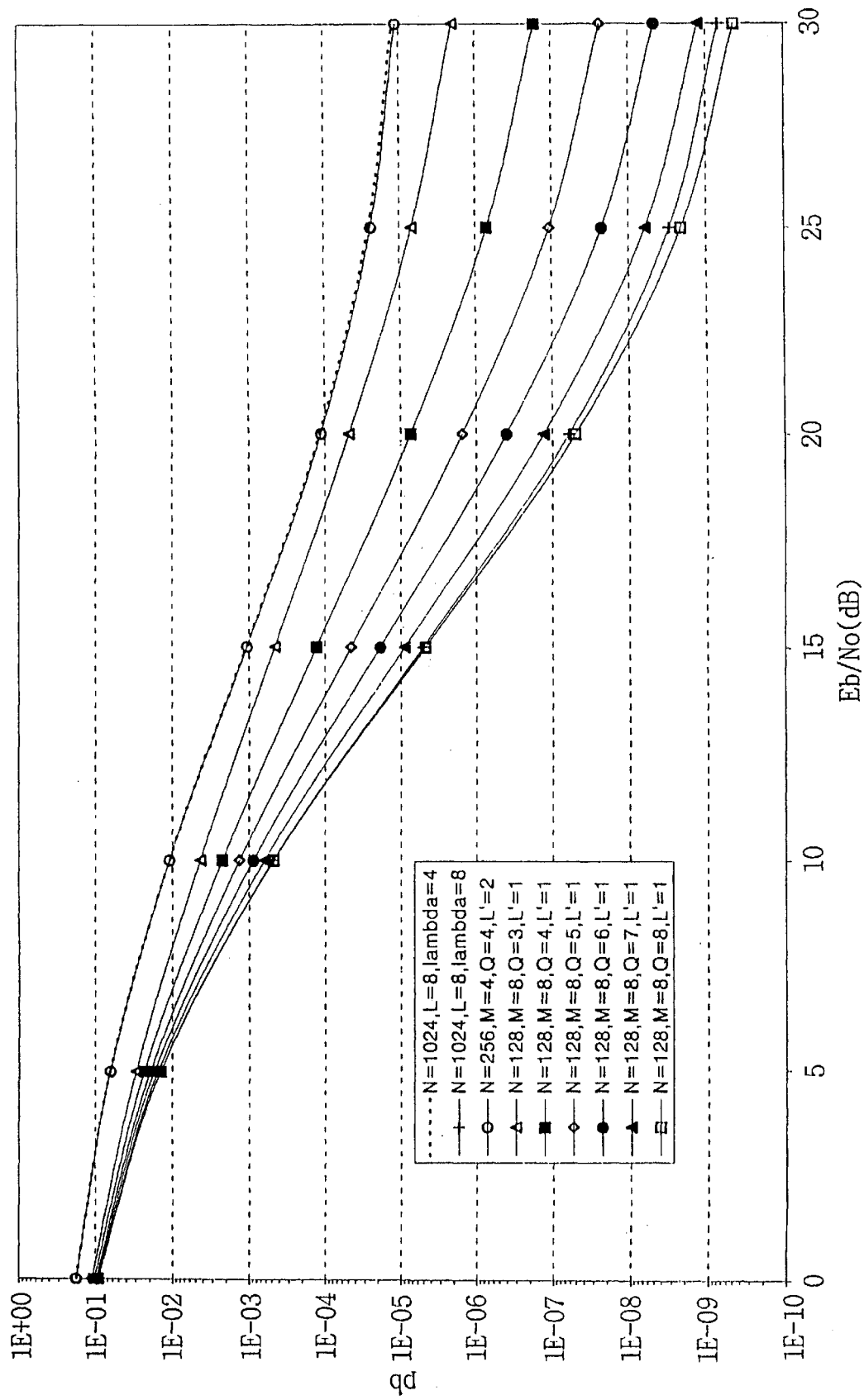
FIGS. 6(a+b) and FIGS. 7(a+b) illustrate the bit error rate of the parallel hopping hybrid DS/SFH CDMA system, where the hopping frequency bands are not overlapped, using diversity combining.
Figure 6B:
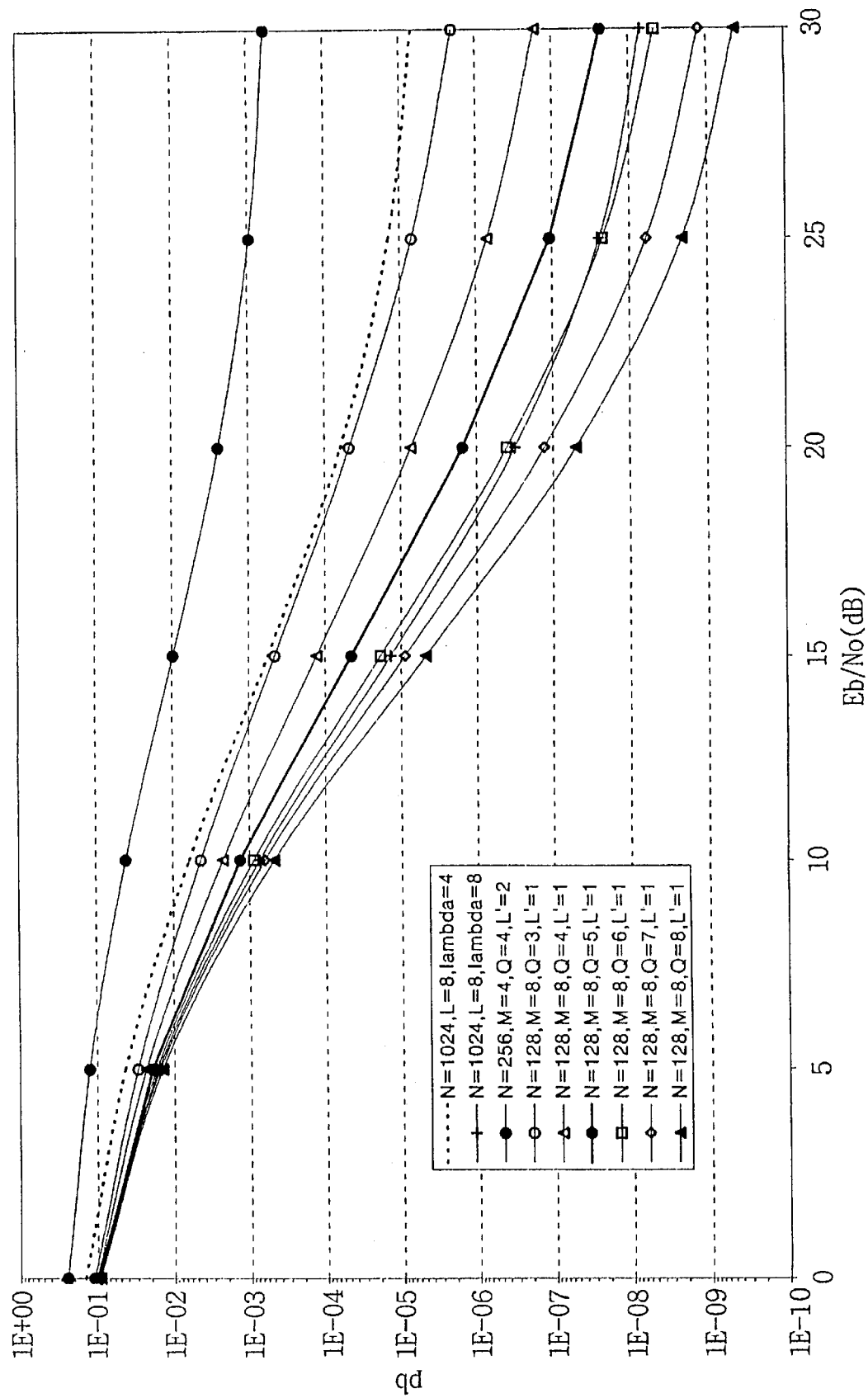

FIG. 6a illustrates the bit error rate for the case in which the fading attenuation coefficient, d=0 (i.e. uniform multi-path intensity profile (MIP)). FIG. 6b illustrates the bit error rate in the case in which the fading attenuation coefficient, d=0.2 (i.e. exponential multi-path intensity profile).

In FIG. 6a the parallel hopping hybrid DS/SFH CDMA system of the present invention with DS processing gain, N=256 and frequency diversity, Q=4 can be regarded as a multi-carrier DS CDMA system with a path diversity value of $\lambda=4$. It should be noted that the higher the frequency diversity, the lower the bit error rate of the parallel hopping hybrid DS/SFH CDMA system, with DS processing gain, N=128.

The parallel hopping hybrid DS/SFH CDMA system, with DS processing gain, N=256, and frequency diversity, Q=8, can be regarded as a multi-carrier DS CDMA system with a path diversity $\lambda=8$.

Additionally, compared to a DS spread spectrum system with a path diversity value of $\lambda=4$, the parallel hopping hybrid DS/SFH CDMA system of the present invention, with DS processing gain, N=128, and a frequency diversity, Q=3, has a lower bit error rate. This is because all users use the same frequency band in the DS CDMA system and the effect of interference by other users is larger than in the parallel hopping hybrid DS/SFH CDMA system.

FIG. 6b refers to an exponential multi-path intensity profile where all receiving power is concentrated on the path in the parallel hopping hybrid DS/SFH CDMA system, and the number of resolvable paths is 1 (i.e. N=128) regardless of the fading attenuation coefficient, d.

The performance of the parallel hopping hybrid DS/SFH CDMA system, with N=256 and frequency diversity, Q=4, is not as good as the uniform multi-path intensity profile, because the improved frequency diversity does not fully offset the degradation in the bit error rate due to the decrease of DS spread spectrum processing gain.

However, the bit error rate of a parallel hopping hybrid DS/SFH CDMA system, with N=128, is lower than that of the DS CDMA system, where the path diversity combining, $\lambda=8$, and the frequency diversity, Q>=6.

Because the path diversity combining characteristic in the signal power of each path is exponentially decaying in the exponential multi-path intensity profile, the signal power intensity of delayed paths is relatively low, so the loss due to the combination of interference components becomes greater than the combination gain of the signal components, even though the diversity combining is performed. As a consequence, the bit error rate becomes higher than that of the uniform multi-path intensity profile.

FIG. 7 is a graph of bit error rate v. number of users, K, for a parallel hopping hybrid DS/SFH CDMA system, where the hopping frequency bands are not overlapped. FIG. 7, the fading attenuation coefficient, d=0.2 (i.e. exponential multi-path intensity profile) and the signal-to-noise ratio, $E_b/N_o$ is 20 dB.

Figure 7A:
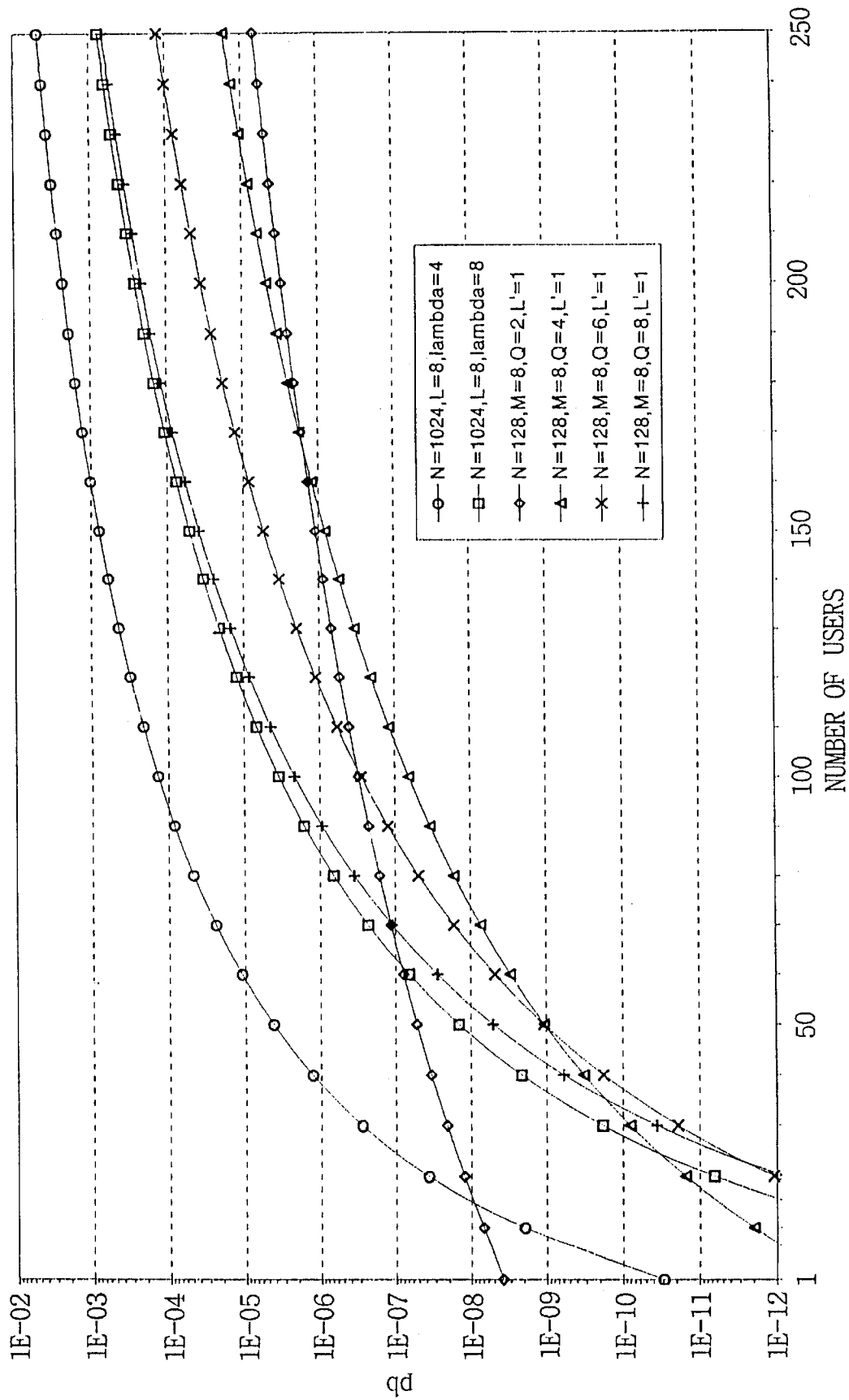
Figure 7B:
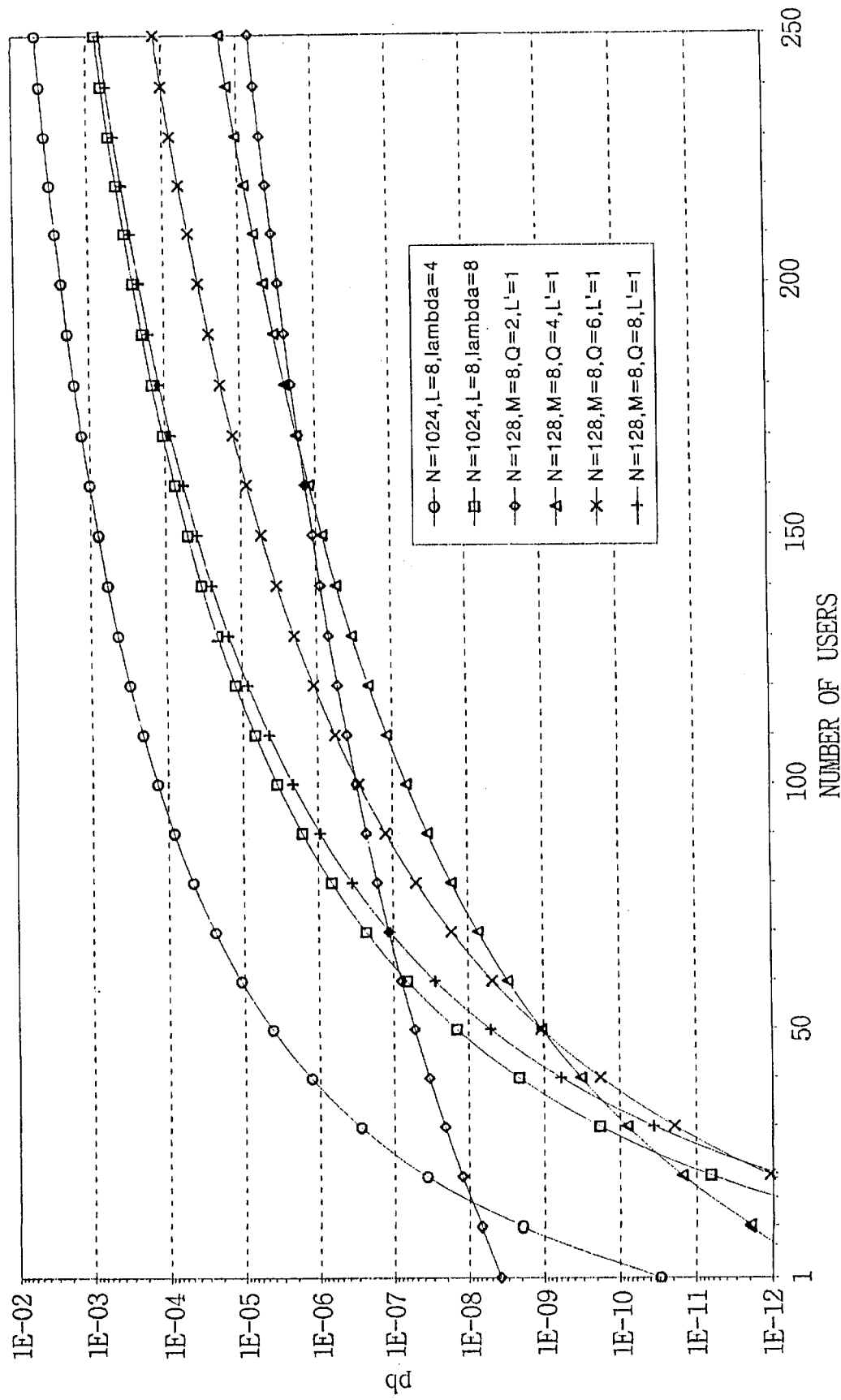

FIG. 7a illustrates the bit error rate for a case in which the fading coefficient, m=1 (Rayleigh Fading). FIG. 7b illustrates the bit error rate in a case where the fading coefficient, m=3 (Rician Fading). As illustrated in both FIGS. 7a and 7b, the bit error rate for a parallel hopping hybrid DS/SFH CDMA system, with N=128, is lower than a DS CDMA system using path diversity.

In the case of Rayleigh Fading (m=1), illustrated at FIG. 7a, the parallel hopping hybrid DS/SFH CDMA system, with N=128, can support approximately 120 users over and above what can be supported with a DS CDMA system with a diversity combining, A=4, and a bit error rate of $10^{-6}$. A, the diversity combining, is equivalent to frequency diversity, Q, in the case of a parallel hopping system, and is equivalent to path diversity, $\lambda$, in the case of a DS CDMA system. When the diversity combining, A=8, the parallel hopping hybrid DS/SFH CDMA system, with N=128 and the DS CDMA system exhibit similar results.

In the case of Rician Fading (m=3), illustrated in FIG. 7b, the parallel hopping hybrid DS/SFH CDMA system, with N=128, with a diversity combining, A=4, and the bit error rate is $10^{-5}$, can support approximately 167 additional users than can be supported by a DS CDMA system. When the diversity combining, A=8, the parallel hopping hybrid DS/SFH CDMA system, with N=128 and a DS CDMA system exhibit similar results.

With regard to the frequency diversity characteristic of the parallel hopping hybrid DS/SFH CDMA system, with N=128, the larger the frequency diversity (i.e. the number of parallel hopping frequencies), the lower the bit error rate, for the case where the number of users is small. Correspondingly, In the case where the number of users is large, the smaller the frequency diversity, the lower the bit error rate. It is because the number of other users that use the same frequency band is increased, if the number of frequency diversity (the number of parallel hopping frequency) becomes larger according to the increase of the number of users, K.

The results depicted in FIG. 7 are applicable for up to approximately 250 users, however, there is a tendency for the bit error rate to increase according to the increase of users, theoretically. It is difficult to distinguish among 250 users using only the difference of phase of the spreading sequence in the parallel hopping hybrid DS/SFH CDMA system, where N=128. However, it is possible to increase the number of distinguishable users using the combination of parallel hopping frequencies along with the DS spreading sequence phase difference, except in the case where the number of available frequencies is the same as the number of frequencies utilized.

Figure 8A:
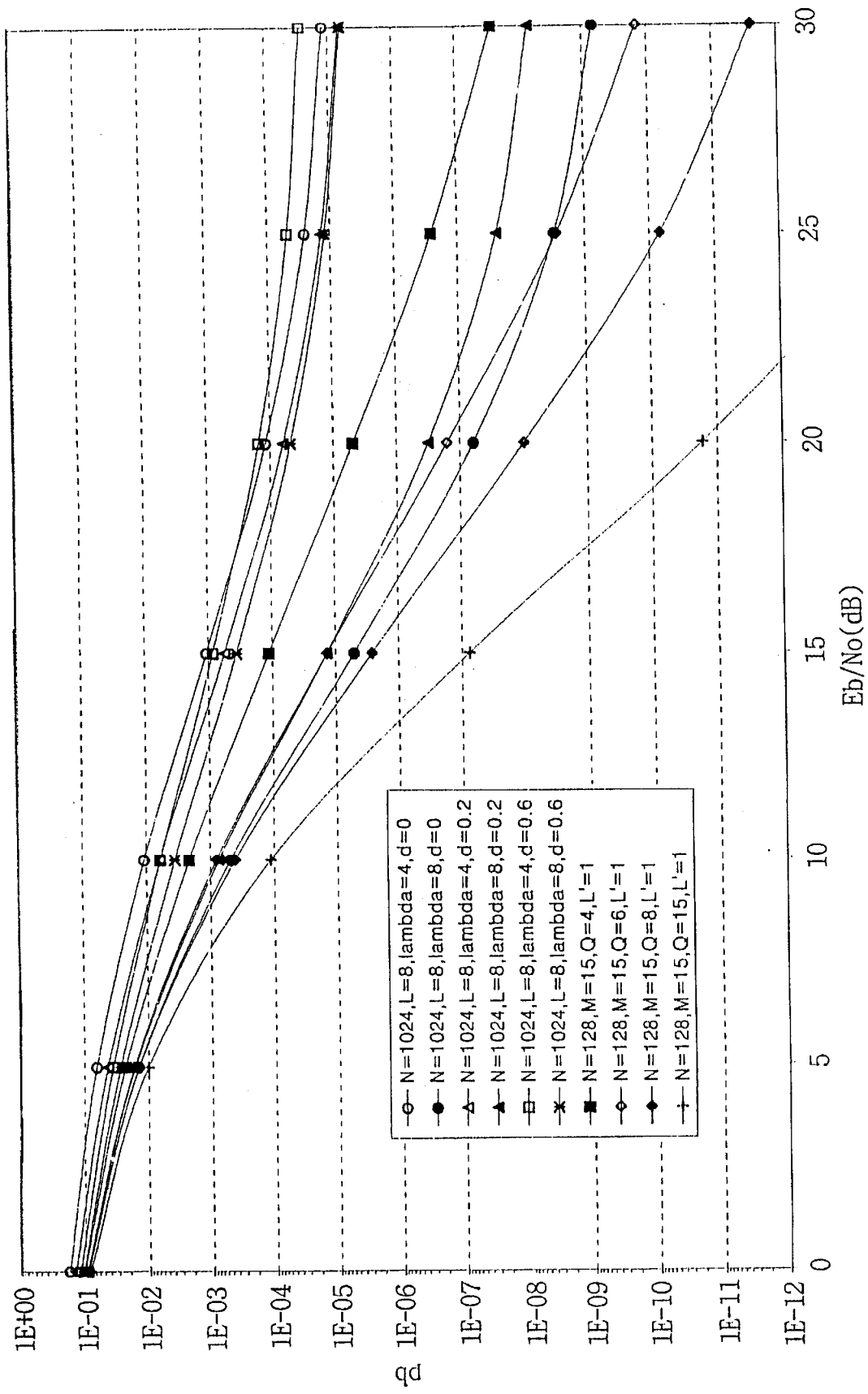
FIGS. 8(a+b)
Figure 8B:
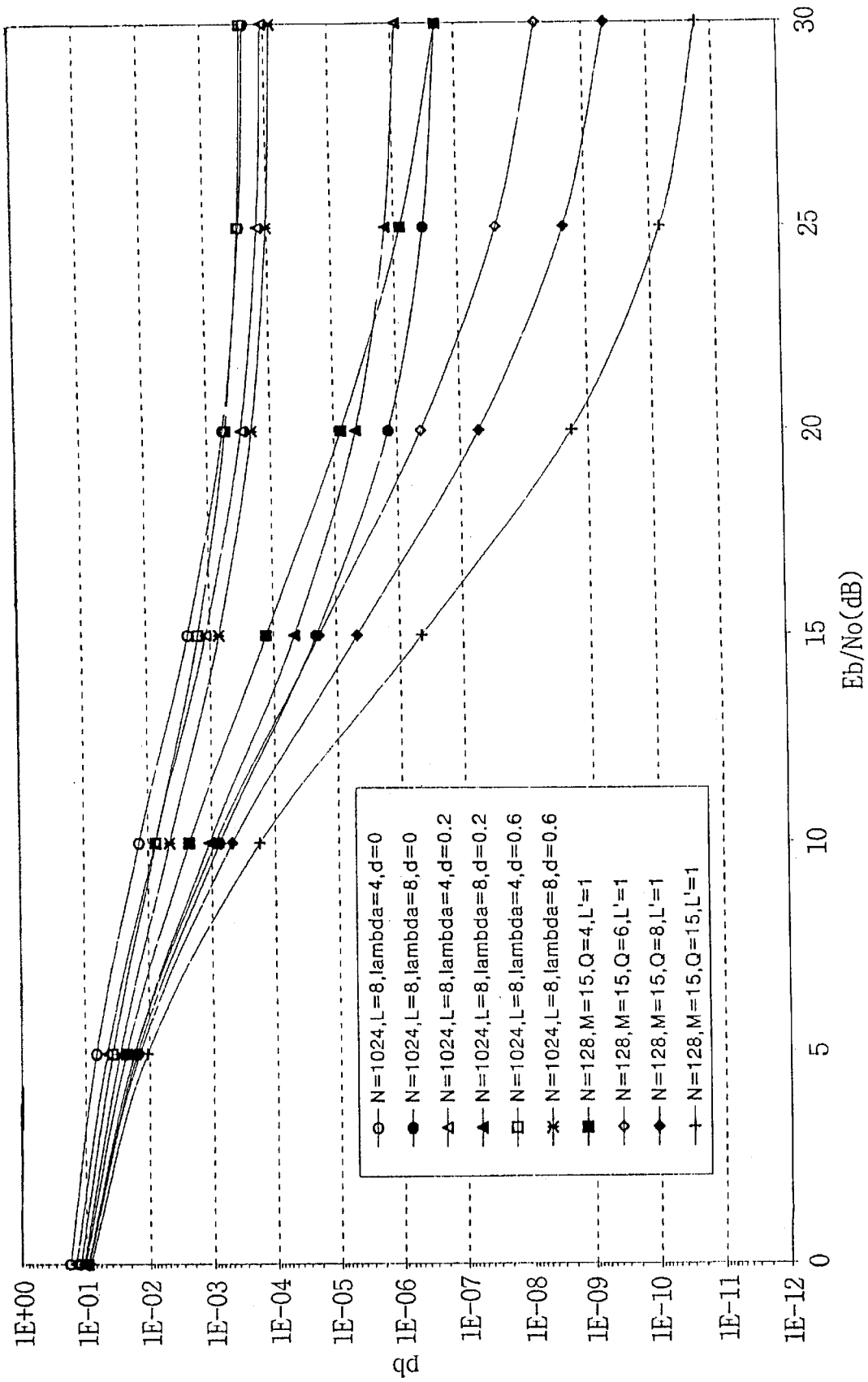

FIG. 8 illustrates a bit error rate result for a parallel hopping hybrid DS/SFH CDMA system where the fading coefficient, m=0.75, and the hopping frequency bands are overlapped. When the fading attenuation coefficient, d is 0.2 and 0.6 respectively, bit error rate results are also provided for path diversity combinings, $\lambda=4$ and $\lambda=8$ for a DS CDMA system where the spread spectrum processing gain is 1024. FIG. 8a illustrates the bit error rate where K=10. FIG. 8b illustrates the bit error rate where K=30.

FIG. 8 illustrates that the bit error rate becomes conspicuously low when the diversity combining is 8 and not 4, and the fading attenuation coefficient, d is either 0 or 0.2, for the case where path diversity is applied to a DS CDMA system. That is, when the number of all users, K, is 10 and 30 respectively, a diversity combining of 8 represents gain on the order of 5.8 dB and 7.4 dB respectively. This result is contrasted with the case where the diversity combining is 4 at a bit error rate of $10^{-3}$. On the other hand, when the fading attenuation coefficient, d, is 0.6 and the number of all users is 10 and 30 respectively, a diversity combining of 8 represents a gain on the order of 1.8 dB and 2 dB, respectively than a case that the number of diversity combining is 4 at the bit error rate of $10^{-3}$. It is because most of the signal powers are included in the front path in accordance that the attenuation coefficient, d becomes large, therefore, it does not obtain high gain even though the number of path diversity combining is increased.

Comparing the DS CDMA system and the parallel hopping hybrid DS/SFH CDMA system, with N=128 and overlapped hopping frequency bands, the parallel hopping hybrid DS/SFH CDMA system has a lower bit error rate. In the case of 10 users, the parallel hopping hybrid DS/SFH CDMA system, with N=128, and has a lower bit error rate than a DS CDMA system where the frequency diversity of the parallel hopping hybrid DS/SFH CDMA system is 8 or more. Further, in the case of 30 users, the parallel hopping hybrid DS/SFH CDMA system, with N=128, has a lower bit error rate than a DS CDMA system where the frequency diversity of the parallel hopping hybrid DS/SFH CDMA system is 6 or more.

If the signal-to-noise ratio, $E_b/N_o$ is increased, only interference by other subscribers has an effect on the bit error rate (interference by fading or noise has no effect), so the bit error rate does not decrease even though the signal-to-noise ratio, $E_b/N_o$ is increased. If the number of users is increased to 30, it can be shown that the error floor is increased, as compared to the case that where number of users is 10.

Figure 9:
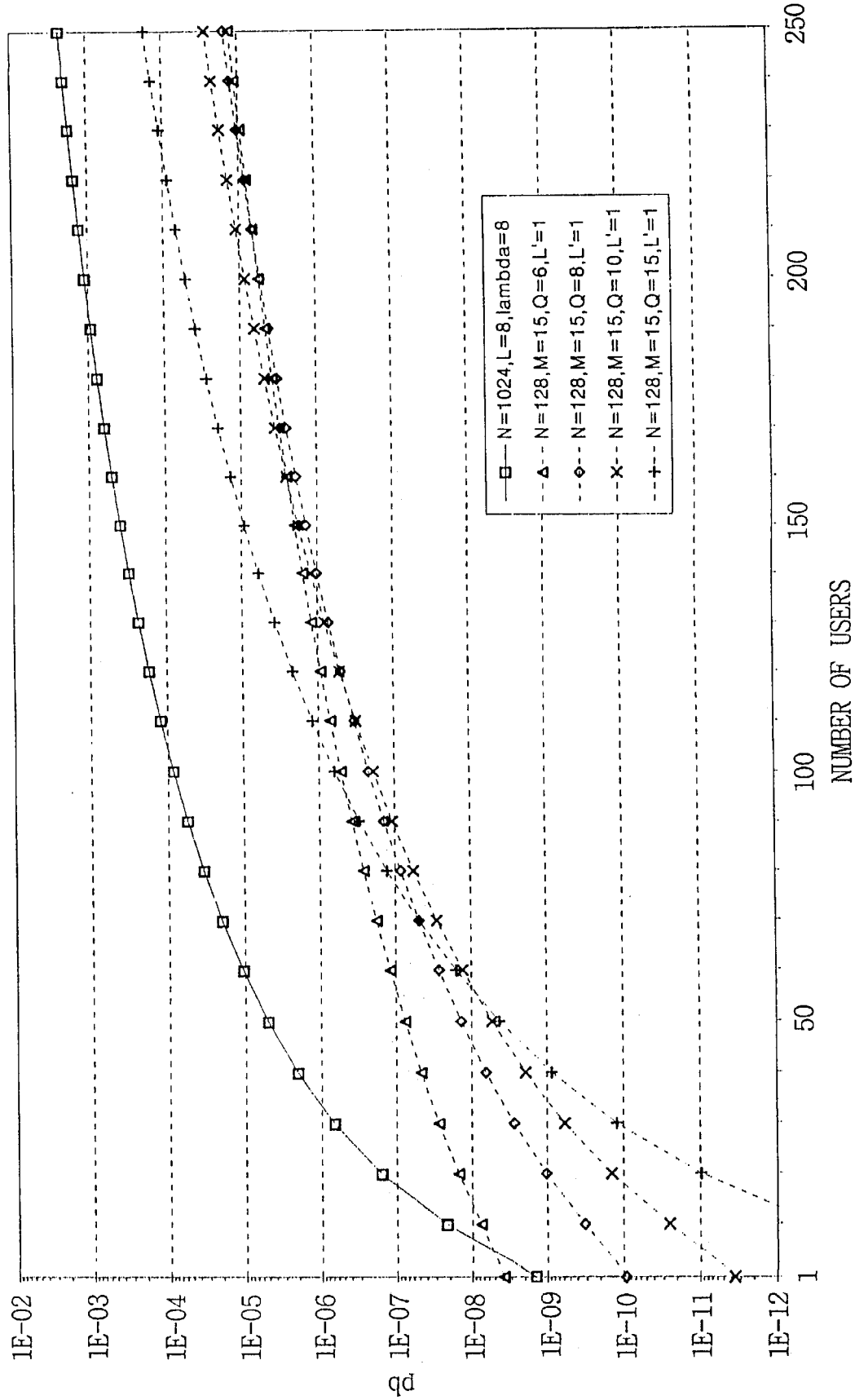
FIG. 9 and FIG. 10 illustrate the bit error rate of the parallel hopping hybrid DS/SFH CDMA system, where the hopping frequency bands are overlapped, using diversity combining.

FIG. 9 illustrates the bit error rate as a function of the increase in the number of all users K, for the parallel hopping hybrid DS/SFH CDMA system of the present invention where the hopping frequency bands are overlapped, the fading coefficient, m is 1, the fading attenuation coefficient, d is 0.2 (exponential multi-path intensity profile) and the signal-to-noise ratio, $E_b/N_o$ is 20 dB.

As illustrated in FIG. 9, the parallel hopping hybrid DS/SFH CDMA system, with N=128, has a lower bit error rate than a DS CDMA system using path diversity. That is, the parallel hopping hybrid DS/SFH CDMA system, with N=128, can support about 90~167 additional users than a DS CDMA system with diversity combining A, at the bit error rate of $10^{-5}$. It is to be understood that the diversity combining A is equivalent to the frequency diversity Q, in the case of the parallel hopping system and is also equivalent to $\lambda$ in the case of a DS system.

Comparing the frequency diversity characteristic of the parallel hopping hybrid DS/SFH CDMA system, with N=128, and overlapped hopping frequency bands, the larger the frequency diversity, Q (i.e. the number of parallel hopping frequencies), the lower the bit error rate for the case where the number of users, K, is small. Further, the smaller the frequency diversity, Q, the lower the bit error rate for the case where the number of users is large. This is because the number of other users using the same frequency band is increased if the number of frequency diversity Q (the number of parallel hopping frequency) becomes large in accordance that the number of users, K is increased.

Figure 10:
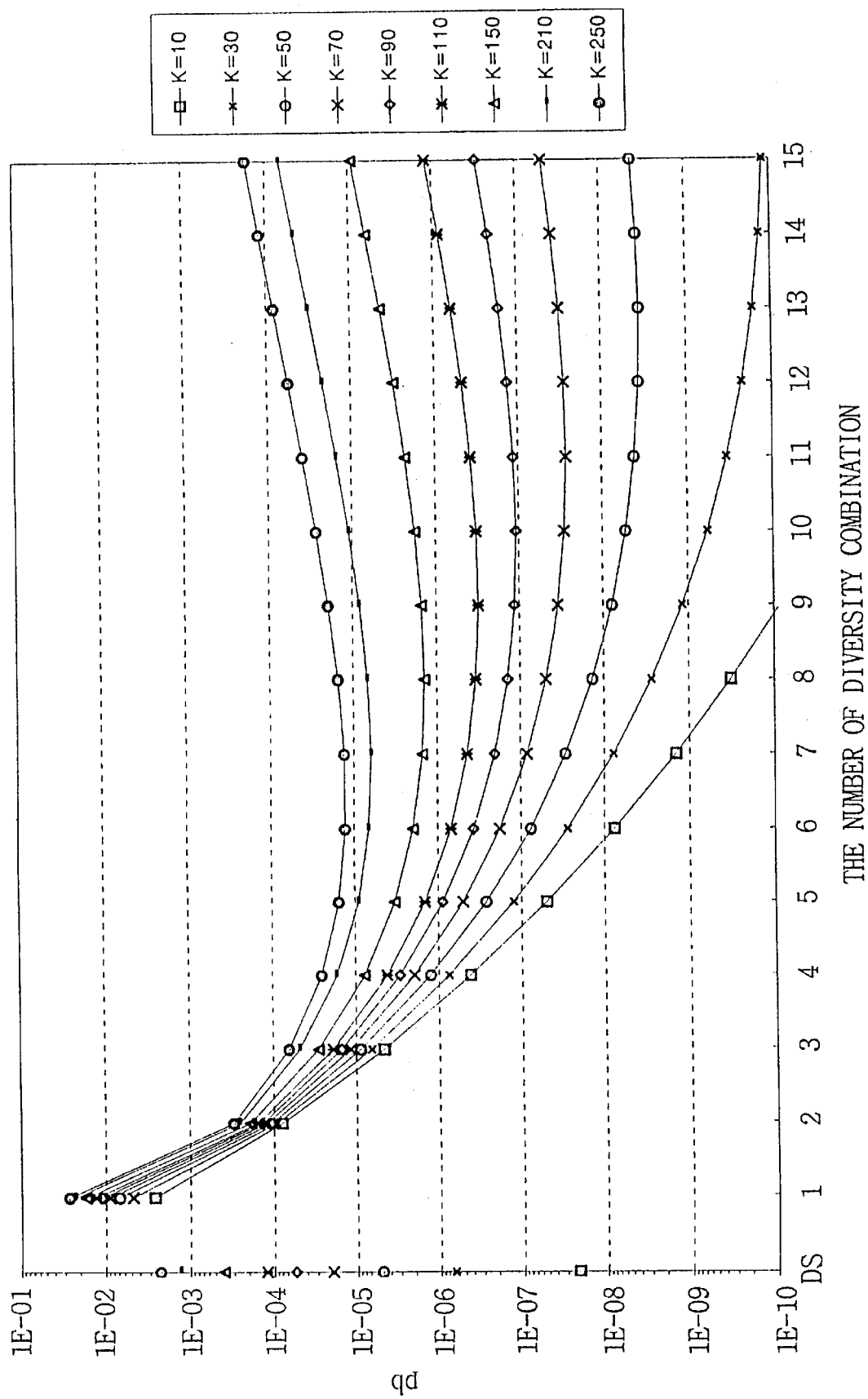

In a case where fading coefficient, m is 1 and the signal-to-noise ratio, $E_b/N_o$ is 20 dB, the bit error rate according to the increase of the number of frequency diversity, Q in the parallel hopping hybrid DS/SFH CDMA system, where the hopping frequency bands are overlapped, is showed in FIG. 10.

FIG. 10 further illustrates a bit error rate for a DS CDMA system where the path diversity is 8, the spread spectrum processing gain is 1024, and the fading attenuation coefficient is 0.2. Comparing the frequency diversity characteristic of the parallel hopping hybrid DS/SFH CDMA system, where N=128 and the hopping frequency bands overlap, the larger the frequency diversity is, the lower the bit error rate for those cases where the number of users is less than 50. It can be found that the lowest bit error rate is represented when the frequency diversity, Q (i.e. the number of parallel hopping frequencies) has a value between 6 to 8 according to the increase of the number of users.

This lowest bit error rate occurs because the number of other users using the same frequency band is increased and the effect of interference by other users is increased if the frequency diversity Q (the number of parallel hopping frequencies) becomes large as the number of users, K is increased.

As stated above, the present invention transmits the DS spread spectrum signal in parallel by separating the whole frequency bandwidth into a plurality of sub-bands and selecting sub-bands partially, consequently, the present invention has an effect in that it can obtain the lower bit error rate than the DS CDMA system, which uses path diversity combining. Additionally, it has an effect of additional frequency diversity in the time varying channel by hopping with the change of carrier being transmitted at every hopping interval.

While it is understood that the present invention may be configured in a wide variety of embodiments, the following list represents some elements of a preferred embodiment:

(1) It is preferable that a transmitter of the present invention include:

a data signal generating unit which generates a data signal to be transmitted;

a direct sequence (DS) spreader for spreading the transmission bandwidth by multiplying the data signal by pseudo-random noise (PN) sequence, thus generating a spread spectrum signal;

a plurality of frequency hopping multipliers for multiplying the spread spectrum signal by a carrier in a plurality of sub-bands;

a plurality of gate function generators for selecting specific sub-bands by switching on/off the signal transmission of each sub-band;

a combiner for combining the signals from sub-bands selected by the plurality of gate function generators; and an RF (Radio Frequency) transmitting unit for transmitting the combined signal via radio path.

(2) It is preferable that the data signal $b_k(t)$, which is to be transmitted for the kth user, is spread according to the spreading signal, $a_k(t)$, characterized as a rectangular pulse stream with duration, $T_c$ which is generated in the spreader for DS spread spectrum.

(3) It is preferable that the spread signal, $a^l_k(t)$ has values of 1 or −1 during the time interval of $lT_c \leq t \leq (l+1)T_c$, the $a^1_k(t)$ being an amplitude of the lth pulse of the spread signal, $a_k(t)$.

(4) It is preferable that the plurality of frequency hopping multipliers (per sub-band) perform a parallel hopping operation on the data signal carrier in each sub-band by multiplying the data signal carrier by the hopping frequency generated in the frequency synthesizer.

(5) It is preferable that the plurality of gate function generators generate on/off signals arbitrarily per sub-band so as to transmit only those signals that have been arbitrarily determined to be on.

(6) It is preferable that the gate function defined herein for a kth user in the mth subband, $w_{k,m}(t)$, has values during the frequency hopping time, $jT_h \leq t \leq (j+1)T_h$ such that) having values of $\{+1,0\}$, and has Q '1's and M-Q '0's and generates on/off signal by arbitrarily determining a sub-band. The gate function, $w_{k,m}(t)$ being generated in the mth gate function generator of the kth user, where t is time interval, j indicates the jth hopping, $T_h$ is frequency hopping time, M is the number of all sub-bands and Q is the number of sub-bands selected among the available M sub-bands as the number of hopping frequencies being used in parallel hopping.

(7) It is preferable that signal $s_k(t)$, which is transmitted for the kth user, is represented as $$s_k(t) = \sum_{m=1}^{M} \sqrt{\frac{2P_k}{Q}} w_{k,m}(t) b_k(t) a_k(t) \cos(2\pi f_m t + \phi_{k,m})$$

where M is the number of all sub-bands and Q is the number of sub-bands selected among all of M sub-bands as the number of hopping frequencies being used in parallel hopping, $P_k$ is power at the transmitting unit for the kth user, $b_k(t)$ is data signal to be transmitted for the kth user, $a_k(t)$ is PN sequence being multiplied in the spreader for DS spread spectrum of the kth user, $w_{k,m}(t)$ is gate function being generated in the mth gate function generator of the kth user, $f_m$ is the mth carrier being multiplied in the frequency hopping apparatus, and $\phi_{k,m}$ is the mth phase component of the kth user.

(8) It is preferable that the transmitter separates the entire frequency bandwidth into a plurality of sub-bands and selects a subset of sub-bands to transmit direct sequence spread spectrum signals in parallel.

(9) It is preferable that the transmitter operates like a multi-carrier direct sequence code division multiple access system in the case where the number of available sub-bands and the number of the selected sub-bands are equal, and the sub-bands do not overlap.

(10) It is preferable that the transmitter operates like a hybrid direct sequence/slow frequency hopping spread spectrum system in the case where the number of selected sub-band is 1 and the sub-bands do not overlap.

(11) It is preferable that the transmitter is constructed in such manner to lower the bit error rate by increasing the frequency diversity combining according to increasing the number of parallel hopping frequencies, in the case where the number of users is small.

(12) It is preferable that the transmitter is constructed in such manner to lower the bit error rate by decreasing the frequency diversity combining according to decreasing the number of parallel hopping frequency, in case where the number of users is large.

(13) It is preferable that the lowest bit error rate is derived in the case where the number of frequency diversity has values ranging from 6 to 8.

(14) It is preferable that the transmitter can support both cases where the hopping frequency bands are overlapped and not overlapped, respectively.

(15) It is preferable that the transmitter has a structure to reduce the influence of interference on other users in such a way that each user uses a frequency band, which is different from each other.

(16) It is preferable that the transmitter makes it possible to get an additional frequency diversity effect in the time varying channel by utilizing a hopping technique which changes the carrier being transmitted every hopping interval.

(17) It is preferable that the receiver of the present invention include:

a high frequency receiving unit changing the received signal into baseband signal;

a direct sequence (DS) despreader for despreading the bandwidth by multiplying the baseband signal by pseudo-random noise (PN) sequence, wherein the PN sequence is same with that in a transmitter and the baseband signal is changed by the high frequency receiving unit;

a plurality of gate function generators selecting the specific sub-band by switching a select signal to be either on/off per each sub-band, wherein the plurality of gate function generators is same with that in the transmitter and the signal is despread by the DS despreader;

a plurality of frequency dehopping multipliers for performing frequency dehopping to the original frequency band by multiplying signals per sub-band by a hopping frequency, wherein the hopping frequency is same with that in the transmitter and the signals are selected by the plurality of gate function generators;

an apparatus for integrate-and-dump detection calculating the correlation value by integrating the signal, which is frequency dehopped by the plurality of frequency dehopping apparatus, during data transmission time;

a diversity combiner combining the signals, which are integrate-and-dump detected by the apparatus for integrate-and-dump detection, with weight values per each branch; and a decision device estimating the initially transmitted signal from the diversity combined values.

(18) It is preferable that the diversity combiner compensates fading components by performing frequency diversity combining per each parallel hopped carrier.

(19) It is preferable that signal of r(t), which is received from the high frequency receiving unit is represented as $$r(t) = \sum_{k=1}^{K} \sum_{m=1}^{M} \sum_{l=1}^{L} \sqrt{\frac{2P_k}{Q}} \beta_{k,m,l} w_{k,m}(t - t_{k,l})$$

$$b_k(t - t_{k,l}) a_k(t - t_{k,l}) \cos(2\pi f_m t + \phi_{k,m,l}) + n(t)$$

where M is the number of all sub-bands and Q is the number of sub-bands selected among all of M sub-bands as the number of hopping frequencies being used in parallel hopping, K is the number of users, L is the number of paths, $P_k$ is transmission power at the transmitting unit for the kth user, $b_k(t)$ is data signal transmitted from the transmitting unit for the kth user, $a_k(t)$ is PN sequence being multiplied in the spreader for direct sequence spread spectrum of the transmitting unit for the kth user, $w_{k,m}(t)$ is gate function being generated in the mth gate function generator of the kth user, $f_m$ is the mth carrier being multiplied in the frequency dehopping apparatus, $b_{k,m,l}$ is path gain of fading channel for the lth path of the mth carrier of the kth user, $t_{k,l}$ is path delay time for the lth path of the kth user, $\phi_{k,m,l}$ is the phase component for the lth path of the mth carrier of the kth user, and n(t) is additive white Gaussian noise.

(20) It is preferable that the receiver separates the entire frequency bandwidth into a plurality of sub-bands and selects partial sub-bands among the whole sub-bands and then transmits direct sequence spread spectrum signals in parallel.

(21) It is preferable that the receiver operates as in multi-carrier direct sequence code division multiple access system in case where the number of all sub-bands and the number of the selected sub-bands are equal, and the sub-bands do not overlap.

(22) It is preferable that the receiver operates like a hybrid direct sequence/slow frequency hopping spread spectrum system in the case where the number of the selected sub-band is 1 and the bandwidths do not overlap.

(23) It is preferable that the receiver is constructed so as to achieve a lower bit error rate by increasing the frequency diversity combining by increasing the number of parallel hopping frequencies, in the case where the number of users is small.

(24) It is preferable that the receiver is constructed so as to achieve a lower bit error rate by decreasing the frequency diversity combining by decreasing the number of parallel hopping frequency, in the case where the number of users is large.

While the invention is susceptible to various modification and alternative forms, specific embodiments thereof have been shown by way of example in the drawings and will be herein be described in detail. It should be understood, however, that it is not intended to limit the invention to the particular forms disclosed, but on the contrary, the intention is to cover all modification, equivalents, and alternatives falling within the spirit and scope of the invention as defined by the appended claims.

What is claimed is:

1. A receiver of a parallel hopping hybrid direct sequence/slow frequency hopping code division multiple access system comprising:

(a) a high frequency receiving unit changing the received signal into baseband signal;

(b) a direct sequence (DS) despreader despreading bandwidth by multiplying said baseband signal by pseudorandom noise (PN) sequence, said PN sequence being same with that in a transmitter, said baseband signal being changed by said high frequency receiving unit;

(c) a plurality of gate function generators selecting the specific sub-band by switching on/off the signal per each sub-band, said plurality of gate function generators are same with that in said transmitter, the signal being despread by said direct sequence (DS) despreader;

(d) a plurality of frequency dehopping apparatus performing frequency dehopping to the original frequency band by multiplying signals per sub-band by hopping frequency, said hopping frequency is same with that in said transmitter, said signals being selected by said plurality of gate function generators;

(e) apparatus for integrate-and-dump detection calculating the correlation value by integrating the signal, which is by said plurality of frequency dehopping apparatus, during data transmission time; (f) a diversity combiner combining the signals, which are integrate-and-dump detected by said apparatus for integrate-and-dump detection, with weight values per each branch; and (g) a decision device estimating the initially transmitted signal from the diversity combined values.

2. The receiver as set forth in claim 1, wherein said diversity combiner compensates fading components by performing frequency diversity combining per each parallel hopped carrier.

3. The receiver as set forth in claim 1, wherein signal r(t), which is received from said high frequency receiving unit, is represented as $$r(t) = \sum_{k=1}^{K} \sum_{m=1}^{M} \sum_{l=1}^{L} \sqrt{\frac{2P_k}{Q}} \beta_{k,m,l} w_{k,m}(t - t_{k,l})$$

$$b_k(t - t_{k,l}) a_k(t - t_{k,l}) \cos(2\pi f_m t + \phi_{k,m,l}) + n(t)$$

where M is the number of all sub-bands and Q is the number of sub-bands selected among all of M sub-bands as the number of hopping frequencies being used in parallel hopping, K is the number of users, L is the number of paths, $P_k$ is transmission power at the transmitting unit for the kth user, $b_k(t)$ is data signal transmitted from the transmitting unit for the kth user, $a_k(t)$ is PN sequence being multiplied in the spreader for DS spread spectrum of the transmitting unit for the kth user, $w_{k,m}(t)$ is gate function being generated in the mth gate function generator of the kth user, $f_m$ is the mth carrier being multiplied in the frequency dehopping apparatus, is path gain of fading channel for the lth path of the mth carrier of the kth user, $t_{k,l}$ is path delay time for the lth path of the kth user, $\beta_{k,m,l}$ is the phase component for the lth path of the mth carrier of the kth user, and n(t) is additive white Gaussian noise.

4. The receiver as set forth in claim 3, wherein said receiver separates the whole frequency bandwidth into a plurality of sub-bands and selects partial sub-bands among the whole sub-bands and then transmits direct sequence spread spectrum signals in parallel.

5. The receiver as set forth in claim 3, wherein said receiver operates as in multi-carrier direct sequence code division multiple access system in case where the number of all sub-bands and the number of the selected sub-bands are equal, and the sub-bands are not overlapped each other.

6. The receiver as set forth in claim 3, wherein said receiver operates as in hybrid direct sequence/slow frequency hopping spread spectrum system in case where the number of the selected sub-band is 1 and the bandwidths are not overlapped.

7. The receiver as set forth in claim 3, wherein said receiver makes it possible to get the lower bit error rate by increasing the number of frequency diversity combining according to increasing the number of parallel hopping frequency, in case where the number of users is small.

8. The receiver as set forth in claim 4, wherein said receiver makes it possible to get the lower bit error rate by decreasing the number of frequency diversity combining according to decreasing the number of parallel hopping frequency, in case where the number of users is large.

* * * * *